United States Patent
Humby et al.

(10) Patent No.: US 9,928,243 B2
(45) Date of Patent: *Mar. 27, 2018

(54) SUPERSEDING OBJECTS IN A RETENTION SYSTEM

(71) Applicant: Open Text Corporation, Waterloo (CA)

(72) Inventors: David Humby, Richmond (CA); Fiona Schrader, Ottawa (CA); Steve Sauder, Ottawa (CA); David Mennie, Ottawa (CA); John-David Dorman, Ottawa (CA)

(73) Assignee: Open Text Corporation, Waterloo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/716,650

(22) Filed: May 19, 2015

(65) Prior Publication Data
US 2015/0370809 A1    Dec. 24, 2015

Related U.S. Application Data

(63) Continuation of application No. 11/541,485, filed on Sep. 29, 2006, now Pat. No. 9,063,940.

(51) Int. Cl.
*G06F 17/30* (2006.01)

(52) U.S. Cl.
CPC .... *G06F 17/30085* (2013.01); *G06F 17/3023* (2013.01); *G06F 17/30309* (2013.01); *G06F 17/30371* (2013.01)

(58) Field of Classification Search
CPC ......... G06F 17/30371; G06F 17/30085; G06F 17/3023; G06F 17/30309; G06F 17/30356; G06F 17/30215; G06F 8/71
See application file for complete search history.

(56) References Cited

U.S. PATENT DOCUMENTS

| 5,806,078 A | 9/1998 | Hug et al. |
| 5,864,875 A | 1/1999 | Van Huben et al. |

(Continued)

OTHER PUBLICATIONS

Office Action issued for U.S. Appl. No. 11/541,485, dated Aug. 6, 2008, 17 pages.
Office Action issued for U.S. Appl. No, 11/541,485, dated Apr. 10, 2009, 12 pages.
Office Action issued for U.S. Appl. No. 11/541,485, dated Jan. 13, 2010, 9 pages.

(Continued)

*Primary Examiner* — Scott A Waldron
*Assistant Examiner* — Fatima Mina
(74) *Attorney, Agent, or Firm* — Sprinkle IP Law Group

(57) ABSTRACT

Superseding a prior version of a document, to which prior version a retention policy or other requirement has been applied, is disclosed. In some embodiments, an attribute of a retention policy indicates whether a document to which the retention policy has been applied is to be superseded by a subsequently created and/or saved version of the document. In some embodiments, the attribute is set by a logic or process configured to apply the retention policy to the document. If the retention policy indicates that supersede is enabled, in various embodiments when a subsequent version is created and/or saved, the prior version is promoted to the final phase of the retention policy that has been applied to it and automatically "qualified" for disposition as indicated in the final phase of the retention policy, without regard to intervening requirements, processes, phases, approvals, retention, waiting, or other periods, etc.

31 Claims, 5 Drawing Sheets

(56) References Cited

U.S. PATENT DOCUMENTS

| | | | |
|---|---|---|---|
| 6,950,257 B1* | 9/2005 | Greco | G11B 5/00813 360/48 |
| 7,404,140 B2 | 7/2008 | O'Rourke | |
| 2004/0153965 A1 | 8/2004 | O'Rourke | |
| 2004/0167901 A1* | 8/2004 | Margolus | G06F 17/30368 |
| 2005/0055518 A1 | 3/2005 | Hochberg et al. | |
| 2005/0055519 A1* | 3/2005 | Stuart | G06F 17/30082 711/159 |
| 2005/0071390 A1 | 3/2005 | Midgley et al. | |
| 2005/0160227 A1* | 7/2005 | Todd | G06F 17/30085 711/133 |
| 2005/0273858 A1 | 12/2005 | Zadok et al. | |
| 2006/0010150 A1* | 1/2006 | Shaath | G06F 17/30085 |
| 2006/0230044 A1* | 10/2006 | Utiger | G06F 17/30345 |
| 2007/0094311 A1 | 4/2007 | Pelletier et al. | |
| 2007/0130232 A1 | 6/2007 | Therrien et al. | |
| 2008/0005204 A1* | 1/2008 | Prus | G11B 27/002 |

OTHER PUBLICATIONS

Office Action issued for U.S. Appl. No. 11/541,485, dated Jul. 9, 2010, 12 pages.
Office Action issued for U.S. Appl. No. 11/541,485, dated Nov. 15, 2010, 14 pages.
Office Action issued for U.S. Appl. No. 11/541,485, dated Apr. 28, 2011, 13 pages.
Office Action issued for U.S. Appl. No. 11/541,485, dated Mar. 16, 2012, 14 pages.
Office Action issued for U.S. Appl. No. 11/541,485, dated Oct. 22, 2017, 11 pages.
Office Action issued for U.S. Appl. No. 11/541,485, dated Sep. 30, 2013, 13 pages.
Office Action issued for U.S. Appl.No. 11/541,485, dated Aug. 13, 2014, 13 pages.
Notice of Allowance issued for U.S. Appl. No. 11/541,485, dated Feb. 27, 2015, 9 pages.

* cited by examiner

SUPERSEDING OBJECTS IN A RETENTION SYSTEM

CROSS REFERENCE TO OTHER APPLICATIONS

This application is a continuation of U.S. patent application Ser. No. 11/541,485, now U.S. Pat. No. 9,063,940, entitled, "SUPERSEDING OBJECTS IN A RETENTION SYSTEM", filed Sep. 29, 2006 which is incorporated herein by reference for all purposes.

BACKGROUND OF THE INVENTION

Records management system, content management system, and other solutions have been provided to manage and provide access to stored content. One aspect managed by some such systems is document/record retention, including disposition (e.g., destruction) once all applicable retention periods and/or requirements have ended. However, for some content objects, it may not always (or in some cases ever) be required and/or desirable to retain all prior versions of a document or other stored content object. For example, prior versions created during a particular phase of a business process to which the document relates, such as an initial creation phase during which an originating author of the document might modify the document many times, with minor changes in each successive version, may not be required or desired to be retained. In such cases, there may be a need to ensure the most recent version is retained, and one way of doing so would be to apply a retention policy to the document, with the retention being inherited by subsequent version. Typically, however, applying retention to a document results in that document being retained, even after a subsequent version has been created and saved. In some cases, there may be a need to be able to discard older versions of less critical content, e.g., to reclaim associated storage space to be used to store more recent and/or more important content. Therefore, there is a need to be able to override retention of at least some prior versions of content objects to which retention has been applied.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Superseding a prior version of a document, to which prior version a retention policy or other requirement has been applied, is disclosed. In some embodiments, an attribute of a retention policy instance and/or associated object indicates whether a document or other content item to which the retention policy has been applied is to be superseded by a subsequently created and/or saved version of the document. In some embodiments, the attribute is set by a retention or other logic or process configured to apply the retention policy to the document. If the retention policy indicates that supersede is enabled, in various embodiments when a subsequent version is created and/or saved, the prior version is promoted to the final phase of the retention policy that has been applied to it and automatically "qualified" for disposition as indicated in the final phase of the retention policy, without regard to intervening requirements, processes, phases, approvals, retention, waiting, or other periods, etc. Final disposition is determined and performed in accordance with the retention policy.

Figure 1:
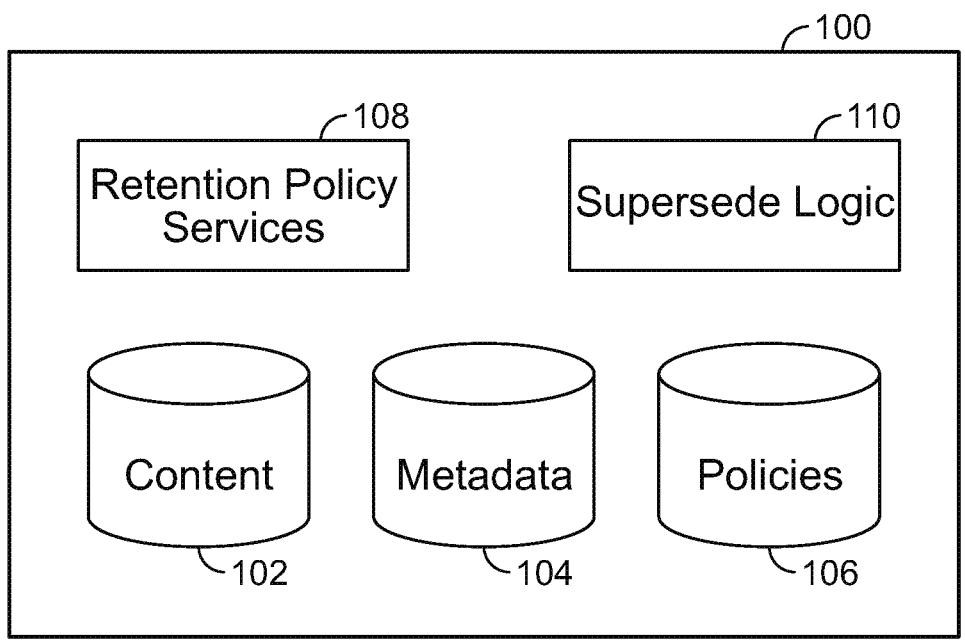
FIG. 1 is a block diagram illustrating an embodiment of a content management system.

FIG. 1 is a block diagram illustrating an embodiment of a content management system. In the example shown, the content management system 100 includes a content store 102 configured to store one or more documents and/or other content items, a metadata store 104 configured to store metadata associated with the content items stored in content store 102. In some embodiments, each content item in content store 102 is represented by one or more associated objects stored in metadata store 104. In some embodiments, a content server, not shown in FIG. 1, provides access to content items stored in content store 102 and/or metadata in metadata store 104. In some embodiments, metadata in metadata store 104 may be used to located one or more content items stored in content store 102, e.g., based on keywords or other attributes (e.g., author, date created, etc.) of the content items. One or more retention policies are stored in a policy store 106. Retention policy services 108 are invoke by application and/or content management system business logic, as appropriate, to enforce policies that have been applied to corresponding content items in content store 102. In some embodiments, a retention (or other) policy is applied to a content item by associating a retainer object and/or an instance of the retention policy with a metadata object that represents the content item in metadata stored in metadata store 104, as described further below with reference to FIG. 2. The content management system 100 also includes a supersede logic 110. Supersede logic 110 in some embodiments overrides a retention policy in prescribed circumstances, e.g., by automatically promoting to a final phase of retention, and qualifying for final disposition at that final phase, a document or other content item that has been superseded by a subsequent version, e.g., when supersede is enabled with respect to the prior version.

Figure 2:
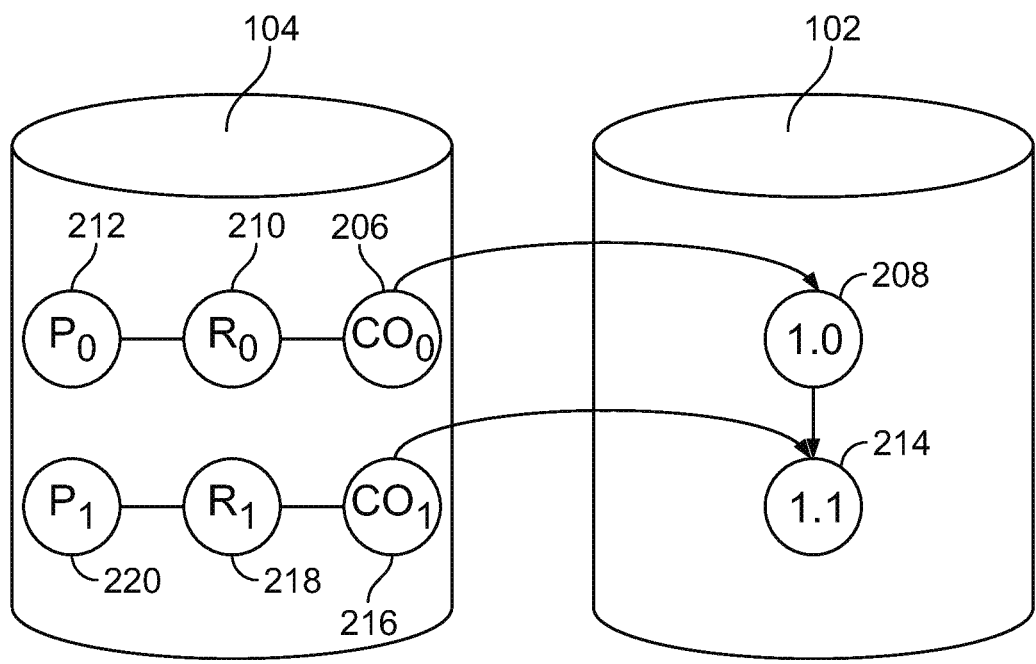
FIG. 2 is a block diagram illustrating an embodiment of retention as applied to successive versions of a content item stored in a content management system.

FIG. 2 is a block diagram illustrating an embodiment of retention as applied to successive versions of a content item stored in a content management system. In the example shown, a first version (1.0) of a content item 208 stored in content store 102 is represented in metadata store 104 by a content object 206. Retention has been applied to the content item 208 by associating with the content object 206 a retainer object 210 configured to apply with respect to the content object 206 and its associated content item 208 a retention policy instance 212. In the example shown, a second, subsequent version (1.1) of the content item, i.e., content item 214 has been created and saved in content store 102. The new version 214 is represented in metadata by an associated content object 216. Retention has been applied by associating with the content object 216 a retainer object 218 configured to apply with respect to the content object 216 and its associated content item 214 a retention policy instance 220. In some embodiments, if the retention policy instance 212 or some other source and/or information indicated that a subsequent version, if any, should supersede the content item 208, i.e., supersede is enabled with respect to the content item 208 and/or retention policy instance 212, the content item 208 would be superseded upon the creation and/or saving (depending on the embodiment) of new version 214. In some embodiments, supersede logic 110 would be invoked and would promote content item 208 to the final phase of retention under policy instance 212, and would immediately qualify content item 208 for final disposition. In some embodiments, content item 208 would be qualified for final disposition without regarding to any intervening phases, retention or other time period, review and/or approval requirements, etc. In various embodiments, final disposition may include on or more of the following: transfer to offline storage and deletion from the content management system, transfer and retention within the content management system, and total destruction (i.e., removal from the content management system without transfer).

Figure 3:
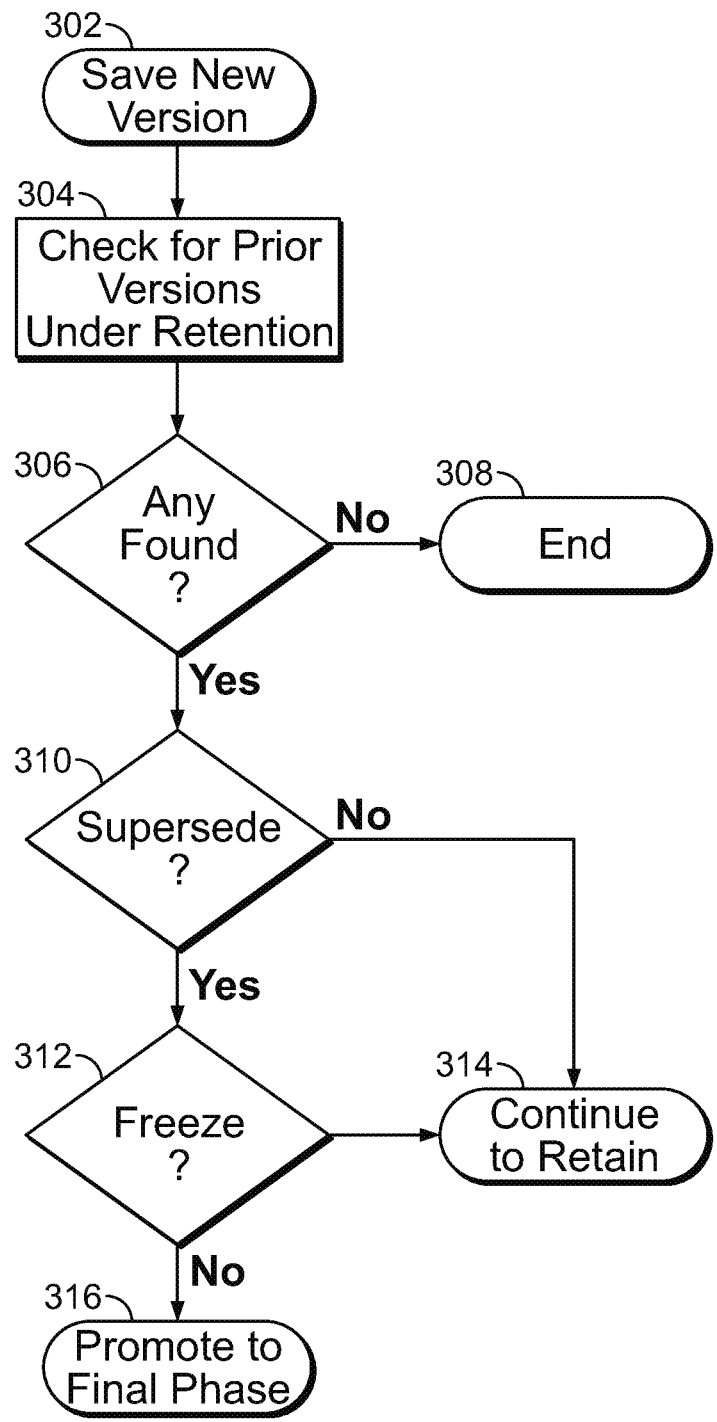
FIG. 3 is a flow chart illustrating an embodiment of a process for selectively superseding prior versions of content items to which retention has been applied.

FIG. 3 is a flow chart illustrating an embodiment of a process for selectively superseding prior versions of content items to which retention has been applied. In some embodiments, the process of FIG. 3 is implemented by supersede logic 110 of FIG. 1. In the example shown, when a new version of a content item is saved (302), a check is done to determine whether any prior version of the content item is under retention (304). If no prior versions under retention are found (306), the process ends (308). If one or more prior versions under retention are found (306), it is determined with respect to each such prior version whether supersede is enabled with respect to that prior version (310). In some embodiments, an attribute of an associated retention policy instance is checked to determine whether supersede is enable. If supersede is not enabled (310), retention of the prior version continues as before (314). If supersede is enabled, a check is done to determine if a freeze has been placed on the content item (312), e.g., due to litigation, regulatory action, applicability to an ongoing investigation, etc. If a freeze is in place (312), retention of the prior version continues as before (314). If supersede is enabled and no hold is in place (310, 312), the content item is promoted to and qualified for final disposition in a final phase of the retention policy that has been applied to it (316). During disposition processing, if a hold is applied to the content object, even though the item has been superseded, the content object cannot be destroyed.

Figure 4:
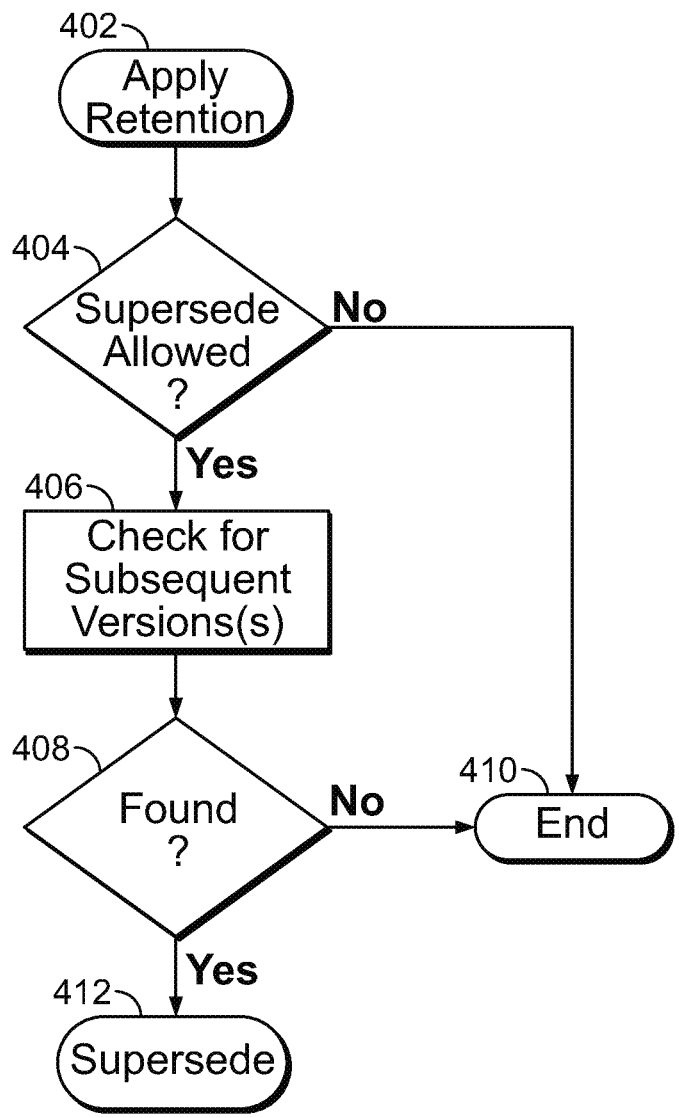
FIG. 4 is a flow chart illustrating an embodiment of a process for selectively superseding an existing version of a content item to which existing version a retention policy with respect to which supersede is enabled is applied.

FIG. 4 is a flow chart illustrating an embodiment of a process for selectively superseding an existing version of a content item to which existing version a retention policy with respect to which supersede is enabled is applied. In some embodiments, the process of FIG. 4 is implemented by supersede logic 110 of FIG. 1. In the example shown, when a retention policy is applied to a content item (402), a check is performed to determine whether supersede is enabled (404). If not, the process ends (410). If supersede is enabled (404), a check for subsequent versions of the content item is performed (406). If no subsequent version is found (408), the process ends. If a subsequent version is found (408), the content item to which the retention policy was applied (402) is superseded (412). As described above, the superseded content item is promoted to the final phase of the applied retention policy, regardless of the conditions, requirements, and intervening phases of the retention policy, and immediately qualified for final disposition as provided for in the policy. The process of FIG. 4 would allow, for example, for a retention policy to be applied to a whole type and/or class of content item (e.g., those stored in a particular physical and/or logical storage location, such as a folder or subdirectory) without resulting in retention of older versions that are no longer required and/or desired to be retained.

Figure 5:
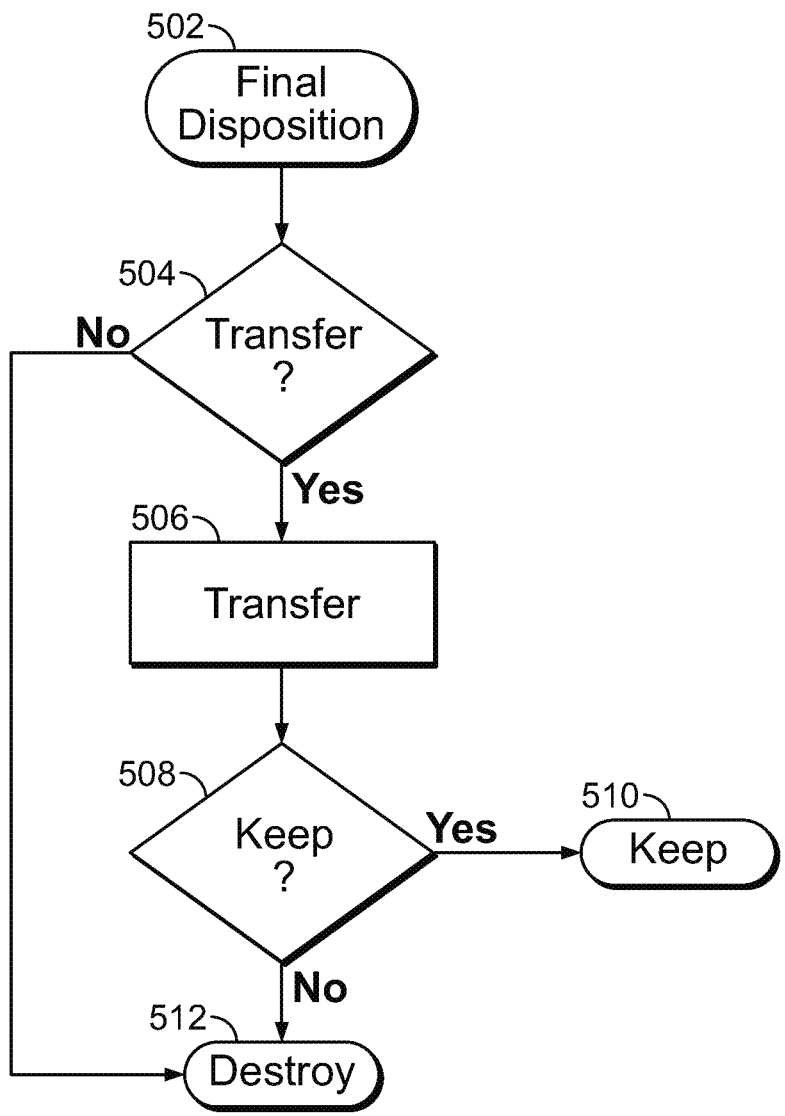
FIG. 5 is a flow chart illustrating an embodiment of a process for final disposition in accordance with an applicable retention policy.

FIG. 5 is a flow chart illustrating an embodiment of a process for final disposition in accordance with an applicable retention policy. An indication is received that a content item has qualified for final disposition in accordance with an applicable retention policy (502). If the final disposition provides for transfer to offline or other storage (504), the transfer is performed (506). After transfer (506), the content item is either retained in the content management system (510) or removed (512), depending on the policy. If the retention policy calls for "total destruction" at final disposition, the content item is removed from the content management system without first transferring a copy to another storage system, location, and/or media volume (504, 512). In some embodiments, whatever final disposition the retention policy indicates, an audit trail is generated to document the final disposition. In some embodiments, the audit trail includes, if applicable, information indicating that the content item qualified for final disposition as a result of being superseded as described herein.

Superseding unwanted and/or unneeded prior versions of content items has been described. Superseding older version that are not required and/or desired to be retained conserves storage space and ensures that only information that is currently relevant and/or required to be retained is stored and managed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing stored content, comprising:
using one or more processors to apply a retention policy to a first version of a content item, wherein the retention policy applied to the first version of the content item includes an attribute that indicates whether a supersede is enabled with respect to the first version of the content item;
using the one or more processors to determine whether the attribute associated with the applied retention policy indicates that the supersede with respect to the first version of the content item is enabled;
in the event that the one or more processors determine at least that (a) the attribute indicates that the supersede with respect to the first version of the content item is enabled and (b) a subsequent version of the content item exists, using the one or more processors to determine whether a hold is applied to the first version of the content item;
in the event that the one or more processors determine at least that (a) the hold is not applied to the first version of the content item, (b) the supersede is enabled with respect to the first version of the content item, and (c) a subsequent version of the content item exists, superseding the first version of the content item by qualifying the first version of the content item for final disposition, wherein final disposition includes determining whether to transfer the first version of the content item to another storage system at a different location from a content management system in which the first version of the content item is stored and transferring a copy of the first version of the content item to the another storage system; and
in the event that the one or more processors determine at least that (a) the hold is applied to the first version of the content item, (b) the supersede is enabled with respect to the first version of the content item, and (c) a subsequent version of the content item exists, overriding the supersede of the first version of the content item so as to retain the first version of the content item.

2. The method of claim 1, wherein the step of superseding includes promoting the first version of the content item to a final phase of the retention policy applied with the first version of the content item and immediately qualifying the first version of the content item for final disposition.

3. The method of claim 2, wherein the step of promoting includes promoting the first version of the content item to the final phase without regard to any intervening requirement or phase of the retention policy applied to the first version of the content item.

4. The method of claim 1, wherein the step of superseding comprises qualifying the first version of the content item for final disposition without regard to any intervening requirement or phase of the retention policy applied to the first version of the content item.

5. The method of claim 1, wherein the retention policy applied to the first version of the content item includes one or more phases for the first version of the content item to go through, including a final phase that indicates a final disposition for the first version of the content item, and wherein the step of superseding the first version of the content item so as to qualify the first version of the content item for final disposition includes advancing the first version of the content item to the final phase of the retention policy.

6. The method of claim 1, wherein the step of superseding the first version of the content item includes superseding the first version of the content item with the subsequent version of the content item.

7. The method of claim 1, wherein the attribute of the retention policy applied to the first version of the content item is set by one or more of the retention policy, business logic, and application logic.

8. The method of claim 1, wherein the final disposition includes generating an audit trail.

9. The method of claim 8, wherein the audit trail indicates that the first version of the content item was qualified for final disposition as a result of being superseded.

10. The method of claim 1, wherein the final disposition further includes
removal of the first version of the content item from the content management system subsequent to transfer.

11. The method of claim 1, wherein the final disposition further includes removal of the content item from the content management system.

12. The method of claim 1, wherein the final disposition further includes removal of the content item from the content management system total destruction of the first version of the content item through removal of the first version of the content item from the content management system without prior transfer.

13. The method of claim 1, wherein the step of overriding the supersede of the first version of the content item comprises applying the retention policy as though the attribute did not indicate that the supersede with respect to the first version of the content item is enabled.

14. The method of claim 1, wherein in the event the one or more processors determine at least that the attribute indicates that the supersede with respect to the first version of the content item is not enabled, continuing to retain the first version of the content item according to the applied retention policy.

15. A content management system, comprising:
a storage area configured to store a first version of the content item and a retention policy applied to the first version of the content item, wherein the retention policy applied to the first version of the content item includes an attribute that indicates whether a supersede is enabled with respect to the first version of the content item; and
a hardware processor coupled to the storage area, the processor configured to:
determine whether the attribute associated with the applied retention policy indicates that the supersede with respect to the first version of the content item is enabled;
in the event that the one or more processors determine at least that (a) the attribute indicates that the supersede with respect to the first version of the content item is enabled and (b) a subsequent version of the first version of the content item exists, determine whether a hold exists in relation to the first version of the content item;
in the event that the one or more processors determine at least that (a) the hold is not applied to the first version of the content item, (b) the supersede is enabled with respect to the first version of the content item, and (c) a subsequent version of the content item exists, supersede the first version of the content item by qualifying the first version of the content item for final disposition, wherein final disposition includes determining whether to transfer the first version of the content item to another storage system at a different location from a content management system in which the first version of the content item is stored and transfer a copy of the first version of the content item to the another storage system; and in the event that the one or more processors determine that (a) the hold is applied to the first version of the content item, (b) the supersede is enabled with respect to the first version of the content item, and (c) a subsequent version of the content item exists, override the supersede of the first version of the content item so as to retain the first version of the content item.

16. The content management system of claim 15, wherein the processor is further configured to, in the event that the one or more processors determine that (a) the hold is not applied to the first version of the content item, (b) the supersede is enabled with respect to the first version of the content item, and (c) a subsequent version of the content item exists, supersede the first version of the content item so as to promote the first version of the content item to a final phase of the retention policy applied with the first version of the content item and immediately qualify the first version of the content item for final disposition.

17. The content management system of claim 16, wherein the processor is further configured to, in the event that the one or more processors determine that (a) the hold is not applied to the first version of the content item, (b) the supersede is enabled with respect to the first version of the content item, and (c) a subsequent version of the content item exists supersede the first version of the content item by promoting the first version of the content item to the final phase of the retention policy applied to the first version of the first version of the content item without regard to any intervening requirement or phase of the retention policy applied to the first version of the content item.

18. The content management system of claim 15, wherein the processor is further configured to, in the event that the one or more processors determine that (a) the hold is not applied to the first version of the content item, (b) the supersede is enabled with respect to the first version of the content item, and (c) a subsequent version of the content item exists, supersede the first version of the content item by qualifying the first version of the content item for final disposition without regard to any intervening requirement or phase of the retention policy applied to the first version of the content item.

19. The content management system of claim 15, wherein the retention policy applied to the first version of the content item includes one or more phases for the first version of the content item to go through, including a final phase that indicates a final disposition for the first version of the content item, and wherein the processor is further configured to, in the event that the one or more processors determine that (a) the hold is not applied to the first version of the content item, (b) the supersede is enabled with respect to the first version of the content item, and (c) a subsequent version of the content item exists, supersede the first version of the content item so as to qualify the first version of the content item for final disposition by advancing the first version of the content item to the final phase of the retention policy.

20. The content management system of claim 15, wherein superseding the first version of the content item includes superseding the first version of the content item with the subsequent version of the content item.

21. The content management system of claim 15, wherein the attribute of the retention policy applied to the first version of the content item is set by one or more of the retention policy, business logic, and application logic.

22. The content management system of claim 15, wherein the final disposition includes generating an audit trail that indicates that the first version of the content item was qualified for final disposition as a result of being superseded.

23. The content management system of claim 15, wherein, in the event that the one or more processors determine that the attribute indicates that the supersede with respect to the first version of the content item is not enabled, continue to retain the first version of the content item according to the applied retention policy.

24. A computer program product for managing stored content, the computer program product being stored on a non-transitory computer readable medium and comprising computer instructions for:

applying a retention policy to a first version of a content item, wherein the retention policy applied to the first version of the content item includes an attribute that indicates whether a supersede is enabled with respect to the first version of the content item;

determining whether the attribute associated with the applied retention policy indicates that the supersede with respect to the first version of the content item is enabled;

in the event that the one or more processors determine at least that the attribute indicates that (a) the supersede with respect to the first version of the content item is enabled and (b) a subsequent version of the first version of the content item exists, determining whether a hold is applied to the first version of the content item;

in the event that the one or more processors determine at least that (a) the hold is not applied to the first version of the content item, (b) the supersede is enabled with respect to the first version of the content item, and (c) a subsequent version of the content item exists, superseding the first version of the content item by qualifying the first version of the content item for final disposition, wherein final disposition includes determining whether to transfer the first version of the content item to another storage system at a different location from a content management system in which the first version of the content item is stored and transferring a copy of the first version of the content item to the another storage system; and in the event that the one or more processors determine at least that (a) the hold is applied to the first version of the content item, (b) the supersede is enabled with respect to the first version of the content item, and (c) a subsequent version of the content item exists, overriding the supersede of the first version of the content item so as to retain the first version of the content item.

25. The computer program product of claim 24, wherein the step of superseding includes promoting the first version of the content item to a final phase of the retention policy applied with the first version of the content item and immediately qualifying the first version of the content item for final disposition.

26. The computer program product of claim 25, wherein step of superseding includes promoting the first version of the content item to the final phase without regard to any intervening requirement or phase of the retention policy applied to the first version of the content item.

27. The computer program product of claim 24, wherein the step of superseding comprises qualifying the first version of the content item for final disposition without regard to any intervening requirement or phase of the retention policy applied to the first version of the content item.

28. The computer program product of claim 24, wherein the retention policy applied to the first version of the content item includes one or more phases for the first version of the content item to go through, including a final phase that indicates a final disposition for the first version of the content item, and wherein the step of superseding the first version of the content item so as to qualify the first version of the content item for final disposition includes advancing the first version of the content item to the final phase of the retention policy.

29. The computer program product of claim 24, wherein superseding the first version of the content item includes superseding the first version of the content item with the subsequent version of the content item.

30. The computer program product of claim 24, wherein the final disposition includes generating an audit trail that indicates that the first version of the content item was qualified for final disposition as a result of being superseded.

31. The computer program product of claim 24, wherein in the event that the one or more processors determine at least that the attribute indicates that the supersede with respect to the first version of the content item is not enabled, continue to retain the first version of the content item according to the applied retention policy.

\* \* \* \* \*